(12) United States Patent
Peng (10) Patent No.: US 11,188,661 B2
(45) Date of Patent: Nov. 30, 2021

(54) SEMI-RULE BASED HIGH PERFORMANCE PERMISSION MANAGEMENT

(71) Applicant: SAP SE, Walldorf (DE)

(72) Inventor: Yang Peng, Shanghai (CN)

(73) Assignee: SAP SE, Walldorf (DE)

( * ) Notice: Subject to any disclaimer, the term of this patent is extended or adjusted under 35 U.S.C. 154(b) by 169 days.

(21) Appl. No.: 16/218,036

(22) Filed: Dec. 12, 2018

(65) Prior Publication Data
US 2020/0193037 A1    Jun. 18, 2020

(51) Int. Cl.
| G06F 21/60 | (2013.01) |
| G06F 21/62 | (2013.01) |
| H04L 29/06 | (2006.01) |
| G06F 16/22 | (2019.01) |
| G06F 16/9535 | (2019.01) |

(52) U.S. Cl.
CPC ........ *G06F 21/604* (2013.01); *G06F 16/2282* (2019.01); *G06F 16/9535* (2019.01); *G06F 21/6218* (2013.01); *H04L 63/102* (2013.01); *H04L 63/105* (2013.01); *G06F 2221/2141* (2013.01)

(58) Field of Classification Search
CPC .............. G06F 21/604; G06F 21/6218; G06F 16/2282; G06F 16/9535; G06F 2221/2141; H04L 63/102; H04L 63/105; H04L 63/20
See application file for complete search history.

(56) References Cited

U.S. PATENT DOCUMENTS

| 9,021,581 B1* | 4/2015 | Bezalel ............... G06F 21/6218 726/21 |
| 10,027,551 B1* | 7/2018 | Rickards ............. G06F 21/6227 |
| 2002/0019827 A1* | 2/2002 | Shiman .................... G06F 16/93 |
| 2002/0048369 A1* | 4/2002 | Ginter ..................... G07F 9/026 380/277 |
| 2004/0103323 A1* | 5/2004 | Dominic ............... H04L 63/126 726/4 |
| 2005/0197871 A1* | 9/2005 | Mendonca .............. H04W 4/02 705/7.19 |
| 2006/0224597 A1* | 10/2006 | Fitzpatrick .............. G06F 16/27 |
| 2011/0173695 A1* | 7/2011 | Ginter ................ H04N 21/6334 726/21 |
| 2013/0124241 A1* | 5/2013 | Yeung ................... G06F 16/285 705/7.11 |

(Continued)

*Primary Examiner* — Cheng-Feng Huang
(74) *Attorney, Agent, or Firm* — Mintz, Levin, Cohn, Ferris, Glovsky and Popeo, P.C.

(57) ABSTRACT

Described herein includes a permission management system that optimizes determination of whether a user has permission to perform an operation using an attribute table. The system may include a permission processor for: determining whether the requesting user has permission to perform the operation, the determining including: generating an attribute table comprising the one or more target users and one or more user attributes, the one or more user attributes comprising metadata associated with the one or more target users; storing the attribute table on the database; generating a reduced attribute table, the generating comprising removing one or more target users from the attribute table; and applying the one or more permission rules to each of the target users remaining in the reduced attribute table.

18 Claims, 6 Drawing Sheets

(56) References Cited

U.S. PATENT DOCUMENTS

| | | | |
|---|---|---|---|
| 2015/0180894 A1* | 6/2015 | Sadovsky | H04L 67/22 |
| | | | 726/22 |
| 2015/0237057 A1* | 8/2015 | Claes | H04L 63/0407 |
| | | | 726/27 |
| 2015/0256526 A1* | 9/2015 | Biegala | H04L 63/20 |
| | | | 726/6 |
| 2016/0063270 A1* | 3/2016 | Brock | G06F 21/6218 |
| | | | 726/28 |
| 2019/0007271 A1* | 1/2019 | Rickards | H04L 63/105 |
| 2019/0253427 A1* | 8/2019 | Kling | G06F 21/6218 |

* cited by examiner

| Target User Name | Age | Salary | Role | Total Working Days |
|---|---|---|---|---|
| Target User 1 | 34 | $120,000 | Manager | 780 |
| Target User 2 | 45 | $115,000 | Manager | 520 |
| Target User 3 | 54 | $145,000 | Manager | 900 |
| Target User 4 | 28 | $130,000 | Manager | 600 |

FIG. 2

| Target User Name | Age | Salary | Role | Total Working Days | ..... |
|---|---|---|---|---|---|
| Target User 2 | 45 | $115,000 | Manager | 520 | |
| Target User 3 | 54 | $145,000 | Manager | 900 | |

SEMI-RULE BASED HIGH PERFORMANCE PERMISSION MANAGEMENT

FIELD

The subject matter described herein relates generally to permission management systems and, more specifically to optimizing the determination of whether a user has permission to perform an operation using an attribute table.

BACKGROUND

Users may need permission to perform certain operations in enterprise computing applications, such as when the operations require access to other users' data. In enterprise computing applications, user permission management may be very complex. As the number of users in an organization grows, the number of user permission types increases rapidly and the web of various linked user permission types becomes more intertwined. Each rule dictating whether a user may perform a particular operation (e.g., to access data of another user) may include sub-rules, and each sub-rule may include sub-rules, and so on, thereby increasing the complexity of a user's request to perform the operation. Accordingly, it may be difficult for a system to quickly determine whether a user has permission to perform a desired operation. This may be especially relevant in batch operations, in which a requesting user requests permission to perform an operation associated with a large group of target users. In such operations, computer processing power, processing speeds, and processing efficiency may suffer as user permission management systems attempt to sort through the increasingly complex permission types associated with each requesting user and target user.

SUMMARY

In some implementations, methods and apparatus, including computer program products, are provided for optimizing the execution of user permission management systems that address the poor performance and processing speeds of current user permission management systems when determining whether a user has permission to perform an operation, such as operations that require access to data of a another user.

In some implementations, there may be provided a method which may include: receiving, by an application server and via a client interface associated with the application server, a query from a requesting user to perform an operation. The operation may include a request to access data related to one or more target users stored in a database. The method may further include determining, by a permission processor of the application server, whether the requesting user has permission to perform the operation. The determining may include generating, by the permission processor, an attribute table. The attribute table may include the one or more target users and one or more user attributes. The one or more user attributes may include metadata associated with the one or more target users. The determining may further include storing, by the permission processor, the attribute table on the database. The determining may also include generating, by the permission processor, a reduced attribute table. The generating may include removing one or more target users from the attribute table. The determining may also include applying, by the permission processor, the one or more permission rules to each of the target users remaining in the reduced attribute table.

In some variations, one or more of the features disclosed herein including the following features can optionally be included in any feasible combination. The one or more target users for removal from the attribute table may be selected based on one or more user attributes associated with the requesting user. The one or more target users for removal from the attribute table may be selected based on one or more permission rules associated with the operation.

In some examples, the generating the attribute table may include scanning, by the permission processor, one or more rules associated with the operation to select one or more user attributes. The generating may also include retrieving, by the permission processor, the one or more user attributes from a data table of the database.

In other examples, the method may further include receiving, by the permission processor, an update to the one or more permission rules. The method may also include updating, by the permission processor, the attribute table based on the updated to the one or more permission rules.

In some examples, the attribute table may include a long column and a string column representing the one or more user attributes.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes a semi-rule based permission management system for improving the management of user permissions on a network. The permission management system described herein may be particularly helpful when users request permission to perform a batch operation, in which a requesting user requests to perform an operation that may require access to data associated with a large number of target users, such as in the enterprise context. The permission management system may include one or more permission processors, such as a rule processor and a translator processor, each running on an application server of the permission management system. The permission processor may generate an attribute table and process permission rules in order to determine whether the requesting user has permission to perform the desired operation. For example, the permission processor (e.g., the rule processor and/or the translator processor) may help to improve the speed at which the permission management system determines whether the user has permission to perform the requested operation. The permission processor may generate an attribute table that includes one or more target users and one or more user attributes associated with each of the target users. The permission processor may also filter the attribute table to generate a reduced attribute table, which includes a reduced set of target user to which the permission processor may apply the permission rules. Accordingly, the permission management system may reduce the amount of time it takes for the system to determine whether the requesting user has permission to perform the desired operation and may reduce the amount of processing power required to determine whether the requesting user has permission to perform the desired operation.

As the number of users in an organization grows, the number of user permission types may increase rapidly and the web of various linked user permission types may become more intertwined. For example, systems may store all user permission mappings, user relationships, requesting user-target user mappings, and the like. When systems receive a request from a requesting user to perform an operation, the systems may determine whether the user has permission to perform the operation based on one or more permission rules and/or groups of permission rules, which may be stored in a database. As each user may be associated with one or more permission rules and/or groups of permission rules, computing performance may suffer. Moreover, users may manage the complex mapping groups (e.g., user groups, user permission groups, user permission mappings, user-user group mappings, etc.). The mapping groups may be difficult to maintain when the number of users increases and systems become more complex. Additionally, when information related to each requesting user changes, the entire database, including all of the permission rule mappings, may be updated, which becomes more difficult as the number of users increases and systems become more complex. Accordingly, it may be difficult to quickly determine whether a user has permission to perform a desired operation.

The difficulty in maintaining user permission mappings may be especially relevant in batch operations, in which a requesting user requests permission to perform an operation associated with a large group of target users. In such operations, computer processing power, processing speeds, and processing efficiency may suffer as the user permission management systems attempt to sort through the increasingly complex permission rules associated with each requesting user and target user.

Some systems may implement a rule-based approach to user permission management. Using the rule-based approach, systems may define rules and determine whether the rules allow a user to perform requested actions. For example, the system may allow a manager requesting to perform an operation to perform the operation when the rule allows managers to access data associated with the operation. The system would check the rule and determine that based on the user's role (e.g., manager), the user could perform the operation. Such strictly rule-based approaches may become problematic, when, for example, a user requests to perform a batch operation, in which the operation requires access to data associated with a large number of target users (e.g., 100, 1,000, 1,000,000, or more target users). In such situations, the systems would apply the permission rules to each of the target users to determine whether the requesting user has permission to access the data associated with each of the target users. The system may take a significant amount of time and computer processing power to apply each of the rules (which may include one or more rules, sub-rules, etc.) to each of the target users, particularly with a large number of target users, thereby decreasing efficiency and computing performance.

In some permission management systems, a user and/or the system may define all requesting user-target user relationships and permissions upfront at system startup. For example, the user and/or the system may initially determine and/or define which requesting user may perform operations requiring access to data associated with each target user. The relationships and/or mappings may then be stored in a database of the system. Accordingly, when the system receives a request from a requesting user to perform an operation requiring access to data associated with one or more target users, the system may access the relationships and/or mappings that are stored in the database to determine whether the requesting user has permission to perform that particular operation with respect to each target user. However, such systems may require a significant amount of startup time, thereby decreasing computing processing performance, speed, and efficiency. Moreover, the system may take a large amount of time to set up and store the initial relationships and/or mappings for a large number of users, and/or to update the relationships and/or mappings when permission rules and/or user data is modified. Such systems may be difficult to maintain when there are a large number of users. Additionally, during batch operations, the systems may require a large amount of time to reference the relationships and/or mappings stored in the database for each user and target user.

Certain implementation of the current subject matter may implement a semi-rule based permission management system to improve computing performance speeds and efficiency. For example, the semi-rule based permission management system may reduce the set of target users and apply a rule-based approach to the reduced set of target users. Accordingly, the semi-rule based permission management system may leverage one or more user attributes (e.g., user metadata) already stored in the database of the system to filter out irrelevant target users, to increase the speed at which the system may determine whether the requesting user has permission to perform the requested operation. The semi-rule based permission management system may also reduce data storage requirements, as the mappings between target users and associated user attributes may be stored in a single data table (e.g., the attribute table).

Figure 1A:
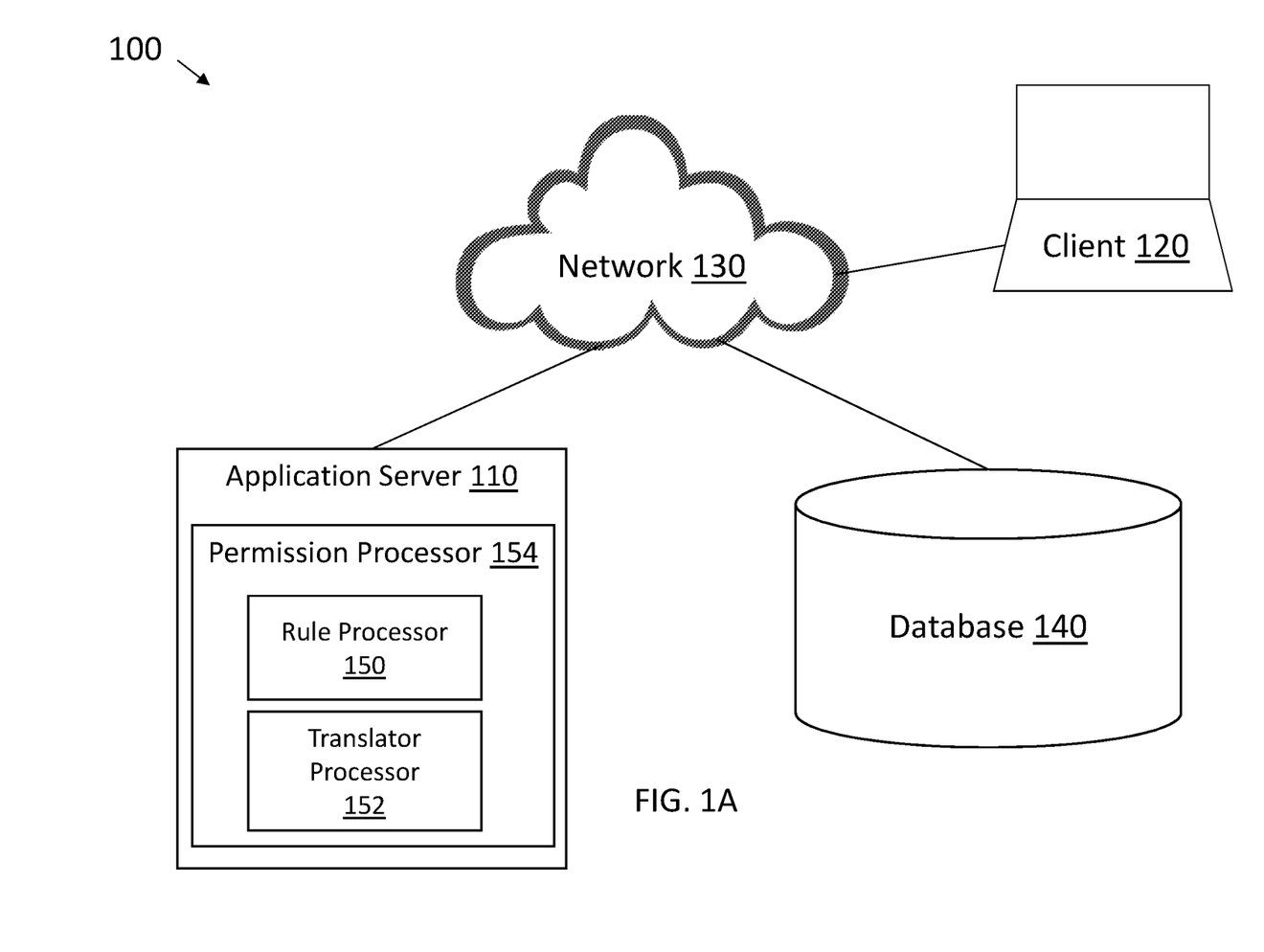
FIG. 1A depicts a system diagram illustrating a permission management system consistent with some implementations of the current subject matter.

FIG. 1A depicts a network block diagram illustrating a permission management system 100 consistent with some implementations of the current subject matter. The permission management system 100 may include an application server 110, one or more clients 120, a database 140, and a wired and/or wireless network 130. The application server 110 may include a permission processor 154, which includes one or more processors, such as a rule processor 150 and a translator processor 152. The one or more processors may interact with various features of the permission management system 100, such as the one or more clients 120 and the database 140, to generate and store an attribute table, filter out irrelevant target users from the attribute table to generate a reduced attribute table, and apply permission rules to each remaining target user in the reduced attribute table, thereby improving computing performance.

During the user permission determination, the permission processor 154 may read and/or write data calculated and/or stored in one or more data tables. The data tables may be stored in the database 140, which may include a database management system (DBMS) that is coupled with an in-memory database, a relational database, and/or any other types of persistence. The permission processor 154 may use the calculated and/or stored data to generate an attribute table (see, for example, FIG. 2) including one or more target users and one or more user attributes associated with each of the one or more target users The permission processor 154 may also generate a reduced attribute table by filtering out or removing irrelevant target users from the attribute table. The attribute table and/or the reduced attribute table may be stored in the database 140.

The one or more clients 120 may include any device that includes at least one processor and at least one memory including program code. For example, the client 120 may be a computer, a tablet, a mobile device, a smart phone, and/or a wearable device. The client 120 may be any data collection device configured with network connectivity. In some implementations, the client 120 may receive code or other software from a user via a display screen. For example, the user may send a request for permission to perform an operation via the client 120. The client 120 may receive one or more instructions and/or commands from the user for executing the permission determination. The client 120 may further receive one or more instructions and/or commands, submitted via the display screen, to determine whether the user has permission to perform an operation via the client 120. According to some implementations, the permission management system 100 may be configured to respond to commands and/or instructions received via the client 120 to make a user permission determination via the client 120, and/or to add to, modify, or remove from the database.

Referring to FIG. 1A, the application server 110 may be communicatively coupled with the one or more clients 120, and/or the database 140 via the wired and/or wireless network 130. The wired and/or wireless network 130 may be a public land mobile network (PLMN), a local area network (LAN), a virtual local area network (VLAN), a wide area network (WAN), a point-to-point link, the Internet, and/or the like.

Figure 1B:
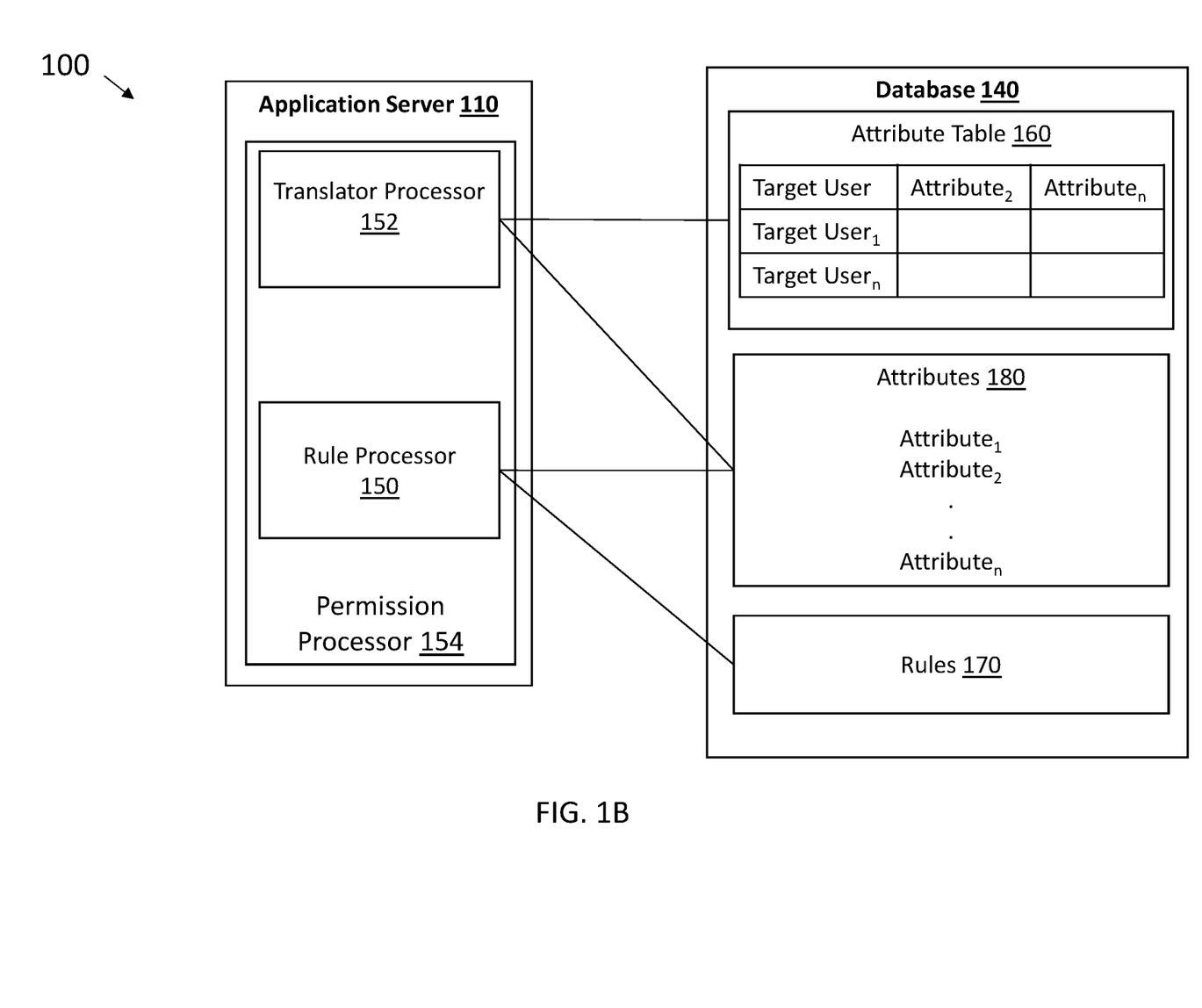
FIG. 1B depicts a detailed system diagram illustrating a permission management system consistent with some implementations of the current subject matter.

FIG. 1B depicts a block diagram illustrating an example of the permission management system 100 including the application server 110 consistent with some implementations of the current subject matter. As noted above, the application server 110 may receive a request to perform an operation that may require access to data of one or more target users, such as via the client 120 (e.g., by a requesting user). The application server 110 may include a permission processor 154, which may include one or more processors, such as the translator processor 152 and the rule processor 150, each of which may be communicatively coupled with the client 120 and the database 140.

The database 140 may store one or more permission rules 170, one or more user attributes 180 (e.g., user metadata), and an attribute table 160. The permission rules 170 may be defined during set up of the permission management system. The permission rules 170 may define the permission types granted to various users. For example, the permission rules 170 may dictate what users or types of users have permission to perform particular operations or types of operations. The permission rules 170 may also determine the type of data that is available to be accessed (e.g., read, written, modified, etc.) by a requesting user or user type.

The attributes 180 include one or more user attributes (e.g., user metadata) that may have already been stored in the database 140. For example, the one or more user attributes may include static attributes and dynamic attributes. The static attributes may include attributes that may not change, or may be entered via the client interface 120, such as a user's name, birthday, division, role, salary, hire date, and the like. The dynamic attributes may include attributes that may be calculated by the permission management system and may be based on one or more static attributes. For example, the dynamic attributes may include total working days, days to birthday, and the like. The permission management system 100 may leverage user metadata that may already be entered into the system and/or stored in the database 140, when, for example, a user is hired, changes roles, and the like.

The permission processor 154 may use the user attributes 180 and/or the permission rules 170 to generate the attribute table 160. For example, the rule processor 150 may scan one or more permission rules 170 to select one or more relevant user attributes from the attributes 180 stored in the database 140. The one or more selected user attributes may be relevant to one or more permission rules associated with a requesting user and/or a requested operation.

Using the one or more selected user attributes, the translator processor 152 may generate the attribute table 160. The attribute table 160 may include the one or more target users and the associated selected user attributes of the target users. In some implementations, the attribute table 160 includes the one or more target users and all of the associated user attributes of the target users. In some implementations, the attribute table 160 includes all of the users of an organization and the associated user attributes of the users.

The attribute table 160 may include fields comprising the target users and columns (e.g., long or string columns) comprising the one or more user attributes associated with each of the target users. The translator processor 152 of the application server 110 may alter the order of the columns in the attribute table 160 depending on relevance. To ensure that the user attributes remain in the correct column when the order of the columns is altered, the translator processor 152 may map the name of the user attribute column with the associated user attributes. For example, a target user's username may be mapped as attributeTable.StringColumn1 and a user's hire data may be mapped as attributeTable.longColumn2.

The attribute table 160 may be updated when, for example, a new target user is added to the attribute table, a target user's user attributes change, one or more rule definitions change, and the like. In some implementations, the application server 110 may update the attribute table 160 in regular or irregular intervals, such as periodically (e.g., monthly, weekly, semi-annually, etc.) or automatically as a new target user is added to the attribute table 160.

Figure 2:
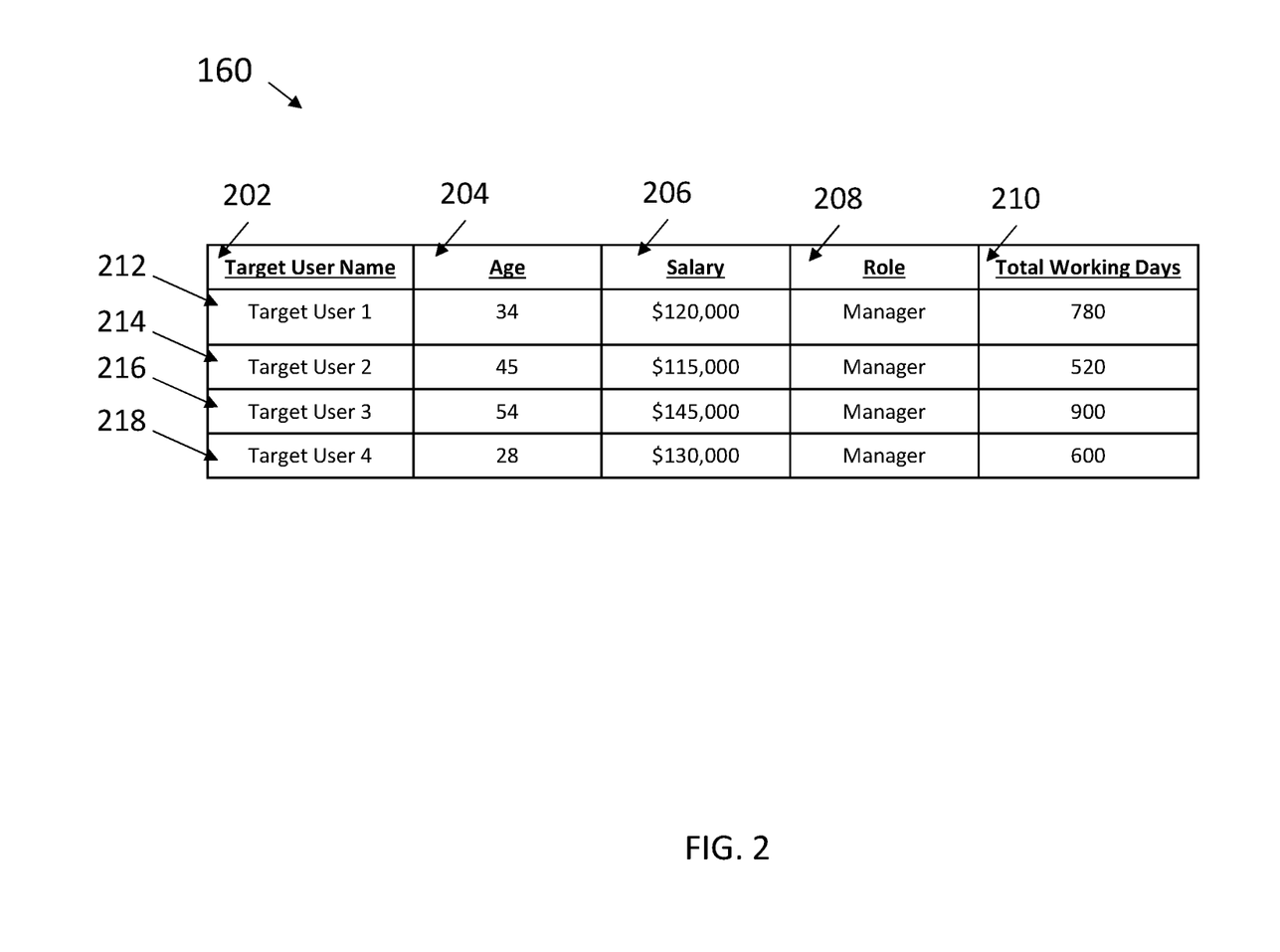
FIG. 2 depicts an example attribute table consistent with some implementations of the current subject matter.

FIG. 2 illustrates an example of the attribute table 160 consistent with implementations of the current subject matter. The attribute table 160 includes one or more columns and fields. The fields of the attribute table 160 represent the target users that the requesting user seeks to access (e.g., a first target user 212, a second target user 214, a third target user 216, a fourth target user 218, and so on) and the columns represent one or more user attributes associated with each of the target users. For example, the columns of the attribute table 160 may include a target user name 202, an age 204 of the target user, a salary 206 of the target user, a role 208 of the target user, and a total working days 210 of the target user. The age 204, the salary 206, and the role 208 of the target user may be static user attributes and the total working days 210 may be dynamic user attributes. The age 204, the salary 206, and the role 208 of each of the target users may have already been stored in the database 140 when the target users entered the organization.

Figure 3:
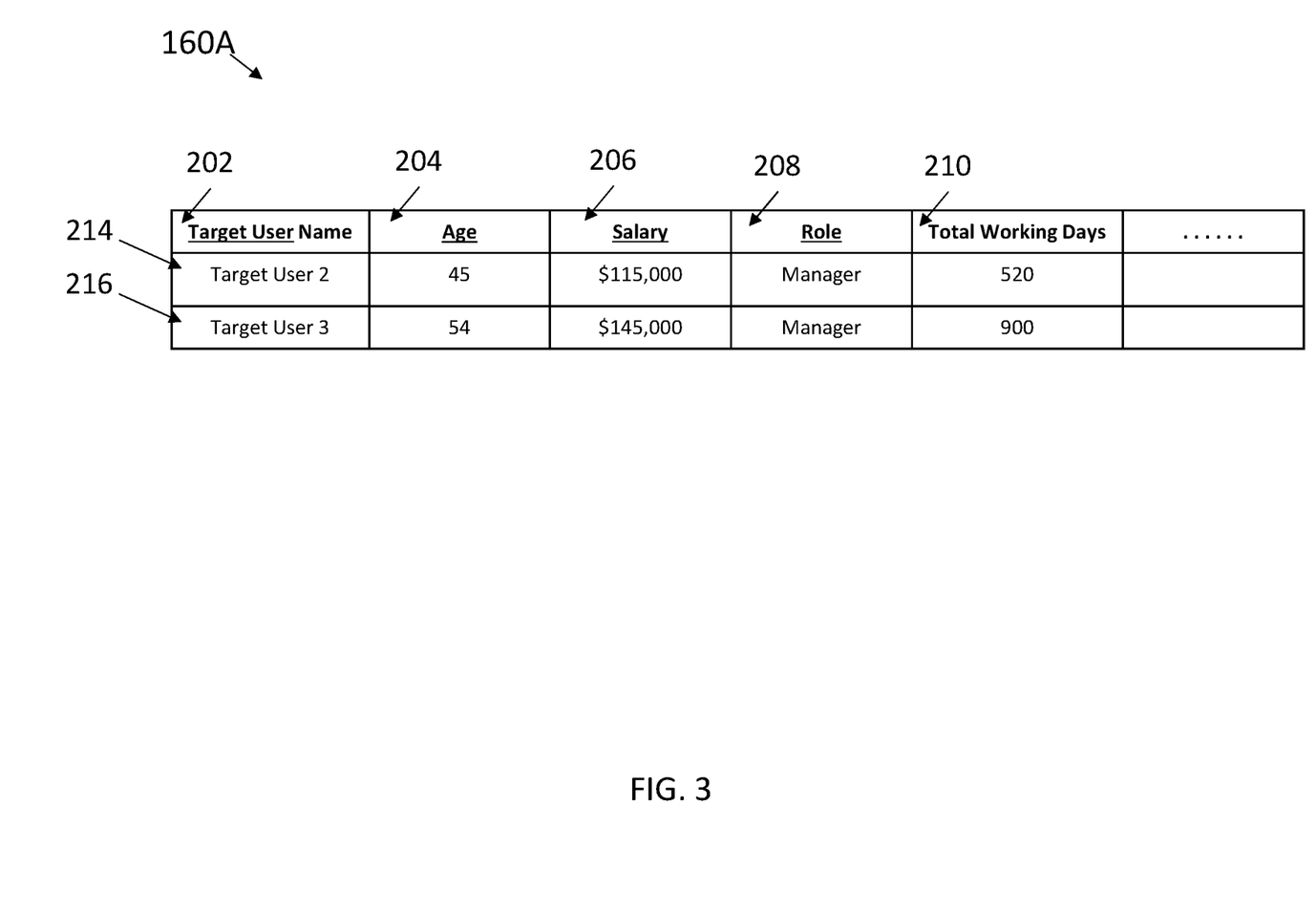
FIG. 3 depicts an example reduced attribute table consistent with some implementations of the current subject matter.

FIG. 3 illustrates an example of a reduced attribute table 160A consistent with implementations of the current subject matter. As noted below, the permission processor 154 (e.g., the translator processor 152) of the application server 110 may generate the reduced attribute table by performing one or more filtering operations. The filtering operations may include filtering out or removing irrelevant target users (e.g., target users that may not have user attributes that satisfy conditions of one or more permission rules). For example, as shown in FIG. 3, the reduced attribute table 160A includes only the third and fourth target users 214, 216 and the associated user attributes of the third and fourth target users 214, 216, as the first and fourth target users 212, 218 have been filtered out. The rule processor 150 may apply the one or more permission rules to the each of the target users (e.g., the third and fourth target users 214, 216) remaining in the reduced attribute table 160A to determine whether the requesting user has permission to perform an operation requiring access to the data of the remaining target users. Applying the one or more permission rules to the target users remaining in the reduced attribute table 160A may help to improve computer processing speeds, efficiency, and performance, at least in part by reducing the number of target users to which the permission processor 154 (e.g., the rule processor 150) applies the permission rules.

Figure 4:
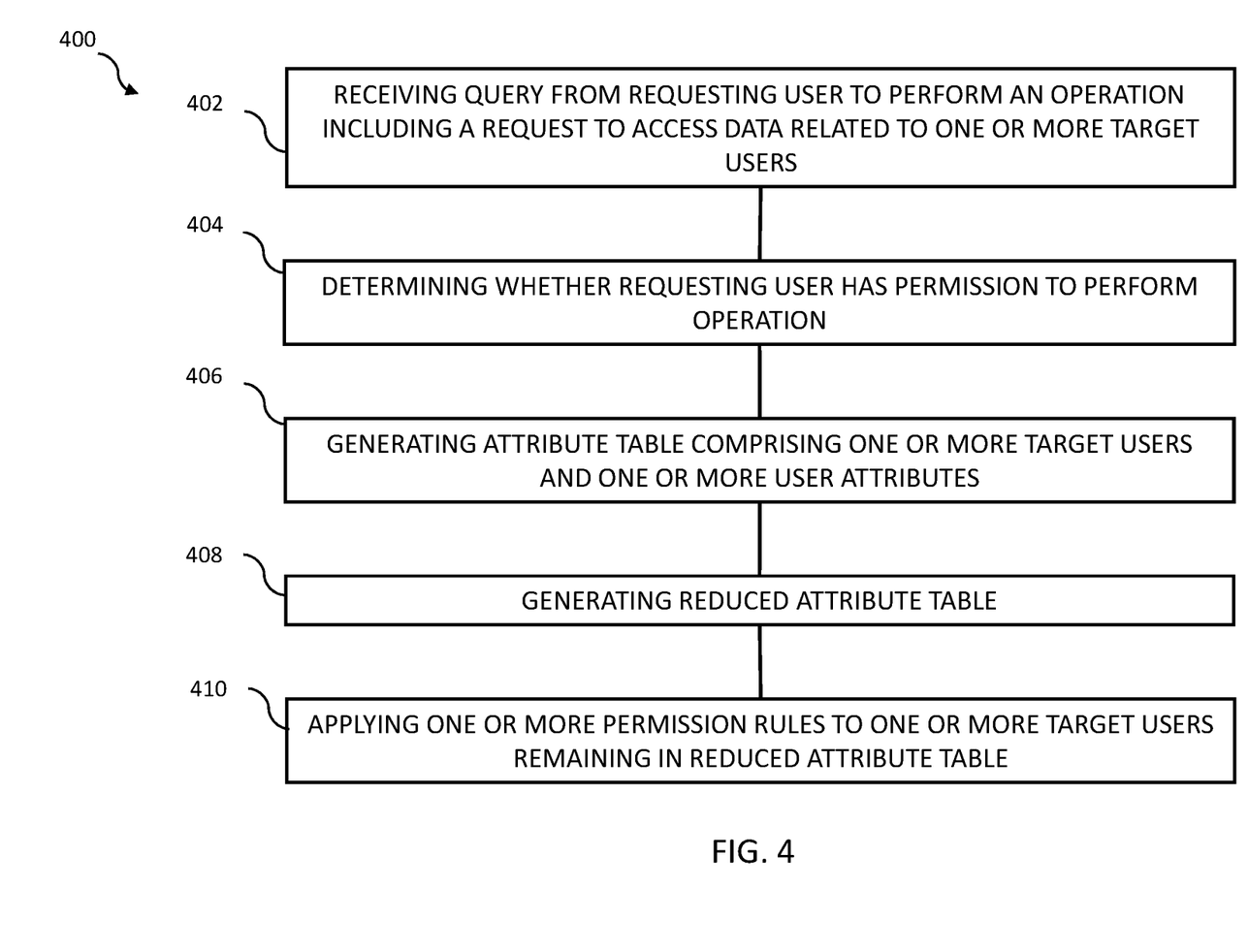
FIG. 4 depicts a flowchart illustrating a process for optimizing permission management consistent with some implementations of the current subject matter.

FIG. 4 shows a process flow chart 400 illustrating features of a process consistent with one or more implementations of the current subject matter.

At 402, the application server (e.g., the application server 110) may receive a query via the client 120 by a requesting user to perform an operation, which may include a request to access data of one or more target users. The operation may include a business action (e.g., form approval, order reject, and the like), and/or a data access type (e.g., forms, charts, employment information, orders, and the like). When the application server receives the query, the application server may locate and/or filter the permission rules that relate to the particular operation requested by the requesting user.

The request to access data of the one or more target users in the operation may be classified as a single mode and/or a batch mode. The single mode may include an operation that requires access to data of one target user, or in some implementations, a relatively low number of target users. The single mode classification may include "who acts on whom's what" syntax and/or "who access (read/write) on whom's what" syntax. Accordingly, in the single mode classification, the permission processor of the application server may need to determine whether the requesting user has permission to perform the operation on one target user or a relatively low number of target users.

In some implementations, when determining whether the requesting user has permission to perform the operation having a single mode classification, the permission processor (e.g., the rule processor) may fetch the target user and/or one or more user attributes associated with the target user, and apply the relevant permission rules to the target user. For single mode classified operations, the permission management system may quickly locate the target user and apply the relevant permission management rules to determine whether the requesting user has permission to access the data associated with the target user, thereby improving processing speeds and efficiency.

The permission management system 100 may be particularly useful and improve processing speeds and performance in determining whether a user has permission to perform an operation having a batch mode classification. Similar to the single mode classification, the batch mode classification may include "who acts on whom's what" syntax and/or "who access (read/write) on whom's what" syntax. In some implementations, the batch mode classification may also include a scope limitation, such as a predefined scope limitation. The scope limitation may indicate that the query from the requesting user to perform an operation includes a request to access data of a large number of target users (e.g., company-wide, department-wide, organization-wide, and the like). When the operation includes a request to access data of a large number of target users, the permission management system 100 may reduce the complexities associated with the large number of target users and number of permission rules associated with each target user.

At 404, the permission processor of the application server may determine whether the requesting user has permission to perform the desired operation. For example, the permission processor may implement a semi-rule based approach to determining whether the user has permission to perform the desired operation. The semi-rule based approach may include reducing the pool of target users and applying permission rules to the reduced set of target users.

At 406, the permission processor 160 (e.g., the translator processor 152) may generate an attribute table (e.g., attribute table 160). As noted above, the attribute table may include the one or more target users and one or more user attributes associated with the one or more target users. The one or more user attributes may include metadata associated with the one or more target users, which was previously stored in the database, such as when the users were added to the organization.

In the attribute table, the permission processor may include some or all of the user attributes associated with the target users. In some implementations, the permission processor generates the attribute table by including one or more relevant user attributes. The permission processor may determine the one or more relevant attributes based on an evaluation of the one or more permission rules. For example, the permission processor may determine which user attributes associated with the target users are relevant for applying the permission rules to the target users. As shown in FIG. 2, the permission processor adds one or more user attributes in columns of the attribute table.

Each permission rule may include one or more relevant user attributes and a condition scope associated with each of the one or more relevant attributes. In some implementations, to determine the relevant attributes associated with each permission rule, the permission processor may separate the user attribute from the condition scope of the rule. In one example, a rule may include the following syntax: "whom.manager=who && whom.department='Sales' && whom.age>45". The rule syntax may be translated into an attribute table query condition. In the example, the subexpression "whom.manager=who" may be translated to "manager='$(CURRENT_USER_ID)'"; "whom.department='Sales'" may be translated to "department='Sales'", and "whom.age>45" may not be translated as the subexpression is a dynamic user attribute.

To generate the attribute table, the permission processor may extract one or more subexpressions from one or more rules, and/or join each of the subexpressions. Based on the subexpressions and/or joined subexpressions, which may reference one or more long columns and/or string columns, the permission processor may generate the attribute table including the one or more target users and the one or more selected user attributes associated with each of the target users.

At 408, the permission processor may generate a reduced attribute table (e.g., reduced attribute table 160A). To generate the reduced attribute table, the permission processor may filter the attribute table based on one or more attributes associated with the requesting user and/or one or more permission rules associated with the operation (and/or any user attributes associated with the one or more permission rules).

In one example, the permission processor may receive a query to perform an operation from a requesting user to perform an operation including a request to access data related to one or more target users. Based on the permission rules associated with the operation, the permission processor may determine that the requesting user has permission to perform operations that require access to data of target users who are over the age of 40. Referring to the example attribute table 160 shown in FIG. 2 and the reduced attribute table 160A shown in FIG. 3. The permission processor (e.g., the translator processor) may filter out target users who do not satisfy the condition defined by the permission rule. In this example, as shown in FIG. 3, the permission processor has generated the reduced attribute table, at least in part by filtering out or removing the target users who do not have a user attribute (e.g., age) that satisfies the age condition defined by the permission rule.

At 410, the permission processor (e.g., the rule processor) may apply the one or more permission rules to each of the target users remaining in the reduced attribute table. Such implementations of the current subject matter allows the permission management system to determine whether the requesting user has permission to perform an operation requiring access to data associated with a reduced set of target users, thereby improving processing speed and efficiency. Accordingly, the permission management system may more quickly determine that a requesting user has or does not have permission to perform the requested operation. When the system determines that the requesting user has or does not have permission to perform the requested operation, the system may notify the requesting user via a client interface (e.g., the client 120) that the request for permission has been approved or denied.

Figure 5:
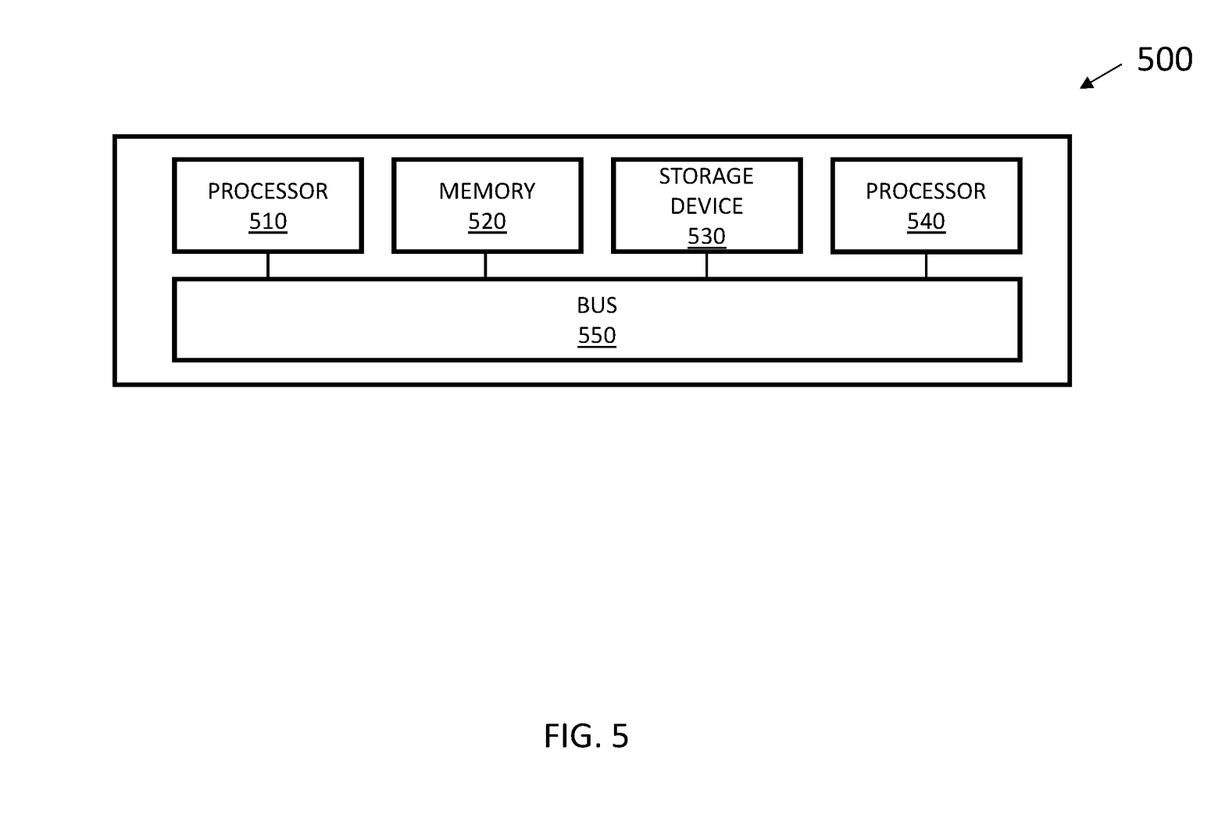
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1A and 5, the computing system 500 may be used with the semi-rule based permission management system 100 and/or any components therein.

As shown in FIG. 5, the computing system 500 may include a processor 510, a memory 520, a storage device 530, and input/output devices 540. The processor 510, the memory 520, the storage device 530, and the input/output devices 540 may be interconnected via a system bus 550. The processor 510 is capable of processing instructions for execution within the computing system 500. The executed instructions may implement one or more components of, for example, semi-rule based permission management system 100. In some implementations of the current subject matter, the processor 510 may be a single-threaded processor. Alternately, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 may store data structures representing configuration object databases, for example. The storage device 530 is capable of providing persistent storage for the computing system 500. The storage device 530 may be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

Consistent with some implementations of the current subject matter, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet).

In some implementations of the current subject matter, the computing system 500 may be used to execute various interactive computer software applications that may be used for organization, analysis and/or storage of data in various formats. Alternatively, the computing system 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities (e.g., SAP Integrated Business Planning as an add-in for a spreadsheet and/or other type of program) or may be standalone computing products and/or functionalities. Upon activation within the applications, the functionalities may be used to generate the user interface provided via the input/output device 540. The user interface may be generated and presented to a user by the computing system 500 (e.g., on a computer screen monitor, etc.).

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store the machine instructions non-transitorily, such as for example as would a non-transient solid-state memory or a magnetic hard drive or any equivalent storage medium. The machine-readable medium may alternatively or additionally store the machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, the phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   receiving, by an application server and via a client interface associated with the application server, a query from a requesting user to perform an operation including a request to access data related to one or more target users stored in a database, the request associated with one or more permission rules; and
   determining, in response to receiving the query and by a permission processor of the application server, whether the requesting user has permission to perform the operation, the determining including:
   generating, by the permission processor, an attribute table comprising the one or more target users and one or more user attributes, the one or more user attributes comprising metadata associated with the one or more target users, the attribute table further comprising: one or more rows; and a first total number of the one or more rows, wherein each of the one or more rows corresponds to a different target user of the one or more target users;
   storing, by the permission processor, the attribute table on the database;
   generating, by the permission processor and based on a condition defined by the one or more permission rules, a reduced attribute table, the generating comprising removing, from the attribute table, a row of the one or more rows such that the reduced attribute table comprises a second total number of the one or more rows that is less than the first total number, wherein the condition comprises a first user attribute of the one or more user attributes; and
   applying, by the permission processor, the one or more permission rules to each of the one or more target users remaining in the reduced attribute table.

2. The system of claim 1, wherein the one or more target users for removal from the attribute table are selected based on one or more user attributes associated with the requesting user.

3. The system of claim 1, wherein the one or more target users for removal from the attribute table are selected based on one or more permission rules associated with the operation.

4. The system of claim 1, wherein generating the attribute table comprises:
  scanning, by the permission processor, one or more rules associated with the operation to select one or more user attributes; and
  retrieving, by the permission processor, the one or more user attributes from a data table of the database.

5. The system of claim 1, wherein the operations further comprise:
  receiving, by the permission processor, an update to the one or more permission rules; and
  updating, by the permission processor, the attribute table based on the update to the one or more permission rules.

6. The system of claim 1, wherein the attribute table comprises a long column and a string column representing the one or more user attributes.

7. A computer-implemented method, comprising:
  receiving, by an application server and via a client interface associated with the application server, a query from a requesting user to perform an operation including a request to access data related to one or more target users stored in a database, the request associated with one or more permission rules; and
  determining, in response to receiving the query and by a permission processor of the application server, whether the requesting user has permission to perform the operation, the determining including:
    generating, by the permission processor, an attribute table comprising the one or more target users and one or more user attributes, the one or more user attributes comprising metadata associated with the one or more target users, the attribute table further comprising: one or more rows; and a first total number of the one or more rows, wherein each of the one or more rows corresponds to a different target user of the one or more target users;
    storing, by the permission processor, the attribute table on the database;
    generating, by the permission processor and based on a condition defined by the one or more permission rules, a reduced attribute table, the generating comprising removing from the attribute table, a row of the one or more rows such that the reduced attribute table comprises a second total number of the one or more rows that is less than the first total number, wherein the condition comprises a first user attribute of the one or more user attributes; and
    applying, by the permission processor, the one or more permission rules to each of the one or more target users remaining in the reduced attribute table.

8. The method of claim 7, wherein the one or more target users for removal from the attribute table are selected based on one or more user attributes associated with the requesting user.

9. The method of claim 7, wherein the one or more target users for removal from the attribute table are selected based on one or more permission rules associated with the operation.

10. The method of claim 7, wherein generating the attribute table comprises:
  scanning, by the permission processor, one or more rules associated with the operation to select one or more user attributes; and
  retrieving, by the permission processor, the one or more user attributes from a data table of the database.

11. The method of claim 7, further comprising:
  receiving, by the permission processor, an update to the one or more permission rules; and
  updating, by the permission processor, the attribute table based on the update to the one or more permission rules.

12. The method of claim 7, wherein the attribute table comprises a long column and a string column representing the one or more user attributes.

13. A non-transitory computer-readable medium storing instructions, which when executed by at least one data processor, result in operations comprising:
  receiving, by an application server and via a client interface associated with the application server, a query from a requesting user to perform an operation including a request to access data related to one or more target users stored in a database, the request associated with one or more permission rules; and
  determining, in response to receiving the query and by a permission processor of the application server, whether the requesting user has permission to perform the operation, the determining including:
    generating, by the permission processor, an attribute table comprising the one or more target users and one or more user attributes, the one or more user attributes comprising metadata associated with the one or more target users, the attribute table further comprising: one or more rows; and a first total number of the one or more rows, wherein each of the one or more rows corresponds to a different target user of the one or more target users;
    storing, by the permission processor, the attribute table on the database;
    generating, by the permission processor and based on a condition defined by the one or more permission rules, a reduced attribute table, the generating comprising removing from the attribute table, a row of the one or more rows such that the reduced attribute table comprises a second total number of the one or more rows that is less than the first total number, wherein the condition comprises a first user attribute of the one or more user attributes; and
    applying, by the permission processor, the one or more permission rules to each of the one or more target users remaining in the reduced attribute table.

14. The non-transitory computer-readable medium of claim 13, wherein the one or more target users for removal from the attribute table are selected based on one or more user attributes associated with the requesting user.

15. The non-transitory computer-readable medium of claim 13, wherein the one or more target users for removal from the attribute table are selected based on one or more permission rules associated with the operation.

16. The non-transitory computer-readable medium of claim 13, wherein generating the attribute table comprises:
  scanning, by the permission processor, one or more rules associated with the operation to select one or more user attributes; and
  retrieving, by the permission processor, the one or more user attributes from a data table of the database.

17. The non-transitory computer-readable medium of claim 13, wherein the operations further comprise:

receiving, by the permission processor, an update to the one or more permission rules; and updating, by the permission processor, the attribute table based on the update to the one or more permission rules.

18. The non-transitory computer-readable medium of claim 13, wherein the attribute table comprises a long column and a string column representing the one or more user attributes.

* * * * *